US012548925B2

(12) United States Patent

Burris et al.

(10) Patent No.: US 12,548,925 B2

(45) Date of Patent: Feb. 10, 2026

(54) COAXIAL BLINDMATE CONNECTORS AND METHODS FOR USING THE SAME

(71) Applicant: CORNING OPTICAL COMMUNICATIONS RF LLC, Glendale, AZ (US)

(72) Inventors: Donald Andrew Burris, Peoria, AZ (US); Thomas Edmond Flaherty, IV, Surprise, AZ (US); David Jeffrey Malouf, Surprise, AZ (US)

(73) Assignee: CORNING OPTICAL COMMUNICATIONS RF LLC, Glendale, AZ (US)

( * ) Notice: Subject to any disclaimer, the term of this patent is extended or adjusted under 35 U.S.C. 154(b) by 421 days.

(21) Appl. No.: 18/081,942

(22) Filed: Dec. 15, 2022

(65) Prior Publication Data

US 2023/0113690 A1 Apr. 13, 2023

Related U.S. Application Data

(63) Continuation of application No. PCT/US2021/036742, filed on Jun. 10, 2021.

(Continued)

(51) Int. Cl.

*H01R 9/05* (2006.01)

*H01R 13/6599* (2011.01)

(Continued)

(52) U.S. Cl.

CPC ......... *H01R 9/0503* (2013.01); *H01R 9/0524* (2013.01); *H01R 13/6599* (2013.01); *H01R 43/20* (2013.01); *H01R 2103/00* (2013.01)

(58) Field of Classification Search

CPC ................ H01R 9/0503; H01R 9/0524; H01R 13/6599; H01R 43/20; H01R 2103/00

See application file for complete search history.

(56) References Cited

U.S. PATENT DOCUMENTS 3,363,221 A 1/1968 Stark 4,925,403 A 5/1990 Zorzy (Continued)

FOREIGN PATENT DOCUMENTS

EP 1547203 A1 6/2005

EP 2817852 A2 12/2014

(Continued)

OTHER PUBLICATIONS

International Search Report and Written Opinion of the International Searching Authority; PCT/US2021/036742; dated Sep. 28, 2021; 17 pages; European Patent Office.

*Primary Examiner* — Briggitte R. Hammond

(74) *Attorney, Agent, or Firm* — Tamika A. Crawl-Bey

(57) ABSTRACT

A coaxial connector includes an outer conductor portion including a polymer shell, the polymer shell defining an inner bore extending from a first open end to a second open end opposite the first open end, and a conductive layer positioned on the inner bore of the polymer shell, an outer surface of the polymer shell, or both, where the conductive layer is structurally configured to be electrically coupled to an outer conductor of a coaxial transmission medium, an electrically-insulating intermediate member positioned at least partially within the inner bore of the polymer shell, and an inner conductor portion engaged with the electrically-insulating intermediate member and positioned at least partially within the inner bore of the polymer shell, where the inner conductor portion is configured to be electrically coupled to an inner conductor of the coaxial transmission medium and electrically isolated from the conductive layer of the outer conductor portion.

19 Claims, 9 Drawing Sheets

Related U.S. Application Data

(60) Provisional application No. 63/041,315, filed on Jun. 19, 2020.

(51) Int. Cl.
*H01R 43/20* (2006.01)
*H01R 103/00* (2006.01)

(56) References Cited

U.S. PATENT DOCUMENTS

| | | | | |
|---|---|---|---|---|
| 5,183,412 | A | 2/1993 | Nagafuji | |
| 6,827,608 | B2 * | 12/2004 | Hall | H01R 24/40 439/654 |
| 7,374,455 | B2 * | 5/2008 | Purdy | H01R 24/566 439/585 |
| 7,607,942 | B1 * | 10/2009 | Van Swearingen | H01R 43/24 439/578 |
| 9,059,545 | B2 | 6/2015 | Mason et al. | |
| 10,276,949 | B2 | 4/2019 | Lee et al. | |
| 11,063,394 | B2 * | 7/2021 | Tsao | H01R 13/6485 |
| 11,942,744 | B2 * | 3/2024 | Tatzel | H01R 43/16 |
| 2006/0172561 | A1 | 8/2006 | Clark et al. | |
| 2010/0159718 | A1 | 6/2010 | Duquerroy et al. | |

FOREIGN PATENT DOCUMENTS

| | | | |
|---|---|---|---|
| WO | 2004/019452 | A1 | 3/2004 |
| WO | 2011/127864 | A2 | 10/2011 |
| WO | 2013/126629 | A2 | 8/2013 |
| WO | 2020/106215 | A1 | 5/2020 |
| WO | 2021/257363 | A1 | 12/2021 |

* cited by examiner

COAXIAL BLINDMATE CONNECTORS AND METHODS FOR USING THE SAME

CROSS-REFERENCE TO RELATED APPLICATION

This application is a continuation of International Application No. PCT/US2021/036742, filed Jun. 10, 2021, which claims the benefit of priority to U.S. Application No. 63/041,315, filed Jun. 19, 2020, both applications being incorporated herein by reference.

BACKGROUND

The present disclosure relates to coaxial blindmate connectors for coupling coaxial transmission media, such as coaxial cables, modules, ports, combinations thereof, and the like, and methods for using coaxial blindmate connectors.

Coaxial transmission media for conveying information at microwave frequencies can be characterized by their relatively small size, which is not only a consequence of the operation frequency range, but is also particularly attributable to the applications and environments of the systems in which they are employed. Such systems, for example, may be found in sophisticated aircraft in which the size and weight of microwave electronics systems often must be small and as light as possible, yet durable and reliable.

BRIEF SUMMARY

In some configurations, opposing male coaxial transmission media may be connected to one another by a double-ended female coaxial connector. More particularly, the double-ended female coaxial connector may electrically couple outer conductors and inner conductors of the opposing male coaxial transmission media. Conventional female coaxial connectors are formed from metal. However, machining the female coaxial connectors is time consuming and costly in high volume applications. Moreover, metal female coaxial connectors are generally rigid, which may limit desirable elastic deformation of the female coaxial connectors. Accordingly, a need exists for improved female coaxial connectors.

In a first aspect A1, the present disclosure provides a coaxial connector, comprising an outer conductor portion, comprising a polymer shell extending in an axial direction, the polymer shell defining an inner bore extending from a first open end to a second open end opposite the first open end, and a conductive layer positioned on the inner bore of the polymer shell, an outer surface of the polymer shell, or both, wherein the conductive layer is structurally configured to be electrically coupled to an outer conductor of a coaxial transmission medium, an electrically-insulating intermediate member positioned at least partially within the inner bore of the polymer shell, and an inner conductor portion engaged with the electrically-insulating intermediate member and positioned at least partially within the inner bore of the polymer shell, wherein the inner conductor portion is configured to be electrically coupled to an inner conductor of the coaxial transmission medium and electrically isolated from the conductive layer of the outer conductor portion.

In a second aspect A2, the present disclosure provides the coaxial connector of aspect A1, wherein the first open end comprises at least two deformable portions that are elastically deformable in a radial direction transverse to the axial direction.

In a third aspect A3, the present disclosure provides the coaxial connector of aspect A2, wherein the at least two deformable portions are separated by at least two slots extending from the first open end along the axial direction.

In a fourth aspect A4, the present disclosure provides the coaxial connector of any of aspects A1-A3, wherein the outer surface defines an inwardly extending taper.

In a fifth aspect A5, the present disclosure provides the coaxial connector of any of aspects A1-A4, wherein the inner conductor portion defines a first inner conductor bore at the first open end and a second inner conductor bore at the second open end.

In a sixth aspect A6, the present disclosure provides the coaxial connector of any of aspects A1-A5, wherein the polymer shell defines an outwardly-extending flange at the first open end.

In a seventh aspect A7, the present disclosure provides the coaxial connector of aspect A6, wherein the outwardly-extending flange defines a rounded surface.

In an eighth aspect A8, the present disclosure provides the coaxial connector of aspect A6, wherein the outwardly-extending flange defines an inwardly-facing surface that faces in the axial direction.

In a ninth aspect A9, the present disclosure provides the coaxial connector of aspect A6, wherein the outwardly-extending flange defines an inwardly-facing surface orthogonal to an adjacent surface of the polymer shell.

In a tenth aspect A10, the present disclosure provides the coaxial connector of any of aspects A1-A9, wherein the outer surface defines one or more inwardly-extending grooves.

In an eleventh aspect A11, the present disclosure provides the coaxial connector of any of aspects A1-A10, wherein the polymer shell defines a thread at the second open end.

In a twelfth aspect A12, the present disclosure provides a coaxial connector, comprising an outer conductor portion, comprising an outer shell extending in an axial direction, the outer shell defining an inner bore extending from a first open end to a second open end opposite the first open end, wherein the first open end comprises at least two deformable portions that are elastically deformable in a radial direction transverse to the axial direction, a conductive layer positioned on at least one of the inner bore of the outer shell and an outer surface of the outer shell, wherein the conductive layer is configured to be electrically coupled to an outer conductor of a coaxial transmission medium, an electrically-insulating intermediate member positioned at least partially within the inner bore of the outer shell, and an inner conductor portion engaged with the electrically-insulating intermediate member positioned at least partially within the inner bore of the outer shell, wherein the inner conductor portion is configured to be electrically coupled to an inner conductor of the coaxial transmission medium and electrically isolated from the conductive layer of the outer conductor portion.

In a thirteenth aspect A13, the present disclosure provides the coaxial connector of aspect A12, wherein the outer surface defines an inwardly extending taper.

In a fourteenth aspect A14, the present disclosure provides the coaxial connector of either of aspects A12 or A13, wherein the outer shell defines an outwardly-extending flange at the first open end.

In a fifteenth aspect A15, the present disclosure provides the coaxial connector of aspect A14, wherein the outwardly-extending flange defines a rounded surface.

In a sixteenth aspect A16, the present disclosure provides the coaxial connector of aspect A14, wherein the outwardly-extending flange defines an inwardly-facing surface s oriented in the axial direction.

In a seventeenth aspect A17, the present disclosure provides the coaxial connector of any of aspects A12-A16, wherein the outer surface defines one or more inwardly-extending grooves.

In an eighteenth aspect A18, the present disclosure provides a method for forming a coaxial connector, the method comprising molding a polymer to form an outer conductor portion having an outer shell that defines an outer surface and an inner bore extending from a first open end to a second open end opposite the first open end in an axial direction, applying a conductive layer to the outer shell of the outer conductor portion, and inserting an inner conductor portion at least partially into the inner bore of the outer shell, wherein the inner conductor portion is structurally configured to be electrically coupled to an inner conductor of a coaxial transmission medium.

In a nineteenth aspect A19, the present disclosure provides the method of aspect A18, wherein applying the conductive layer comprises at least one of chemical deposition and physical deposition.

In a twentieth aspect A20, the present disclosure provides the method of either of aspects A18 or A19, wherein molding the polymer to form the outer conductor portion comprises forming at least two deformable portions at the first open end that are elastically deformable in a radial direction, and wherein the radial direction is transverse to the axial direction.

Additional features and advantages of the technology disclosed in this disclosure will be set forth in the detailed description which follows, and in part will be readily apparent to those skilled in the art from the description or recognized by practicing the technology as described in this disclosure, including the detailed description which follows, the claims, as well as the appended drawings.

BRIEF DESCRIPTION OF THE DRAWINGS

The following detailed description of specific embodiments of the present disclosure can be best understood when read in conjunction with the following drawings, where like structure is indicated with like reference numerals and in which.

Reference will now be made in greater detail to various embodiments, some embodiments of which are illustrated in the accompanying drawings. Whenever possible, the same reference numerals will be used throughout the drawings to refer to the same or similar parts.

DETAILED DESCRIPTION

Embodiments described herein are generally directed to coaxial connectors including an outer shell including deformable portions that allowing the outer shell to elastically deform and form electrical continuity between the deformable portions when engaged with a terminal housing of a coaxial transmission medium. Through selective deformation of the outer shell, coaxial connectors according to the present disclosure may have less reflection loss as compared to conventional coaxial connectors. In some embodiments, the outer shell of coaxial connectors according the present disclosure are formed of materials that can be formed in molding processes, such as polymers and the like, reducing manufacturing costs and material waste as compared to conventional coaxial connectors. These and other embodiments will now be described with reference to the appended drawings.

As referred to herein, the terms "axially inward" and "axially outward" refer to the relative positioning of components of the coaxial connector with respect to a centerline 40 (FIG. 2) that separates the coaxial connector in an axial direction A. Similarly, the terms "radially inward" and "radially outward" refer to the relative positioning of components of the coaxial connector with respect to a centerline 42 (FIG. 2) that separates the coaxial connector in a radial direction R that is transverse to the axial direction A.

Figure 1A:
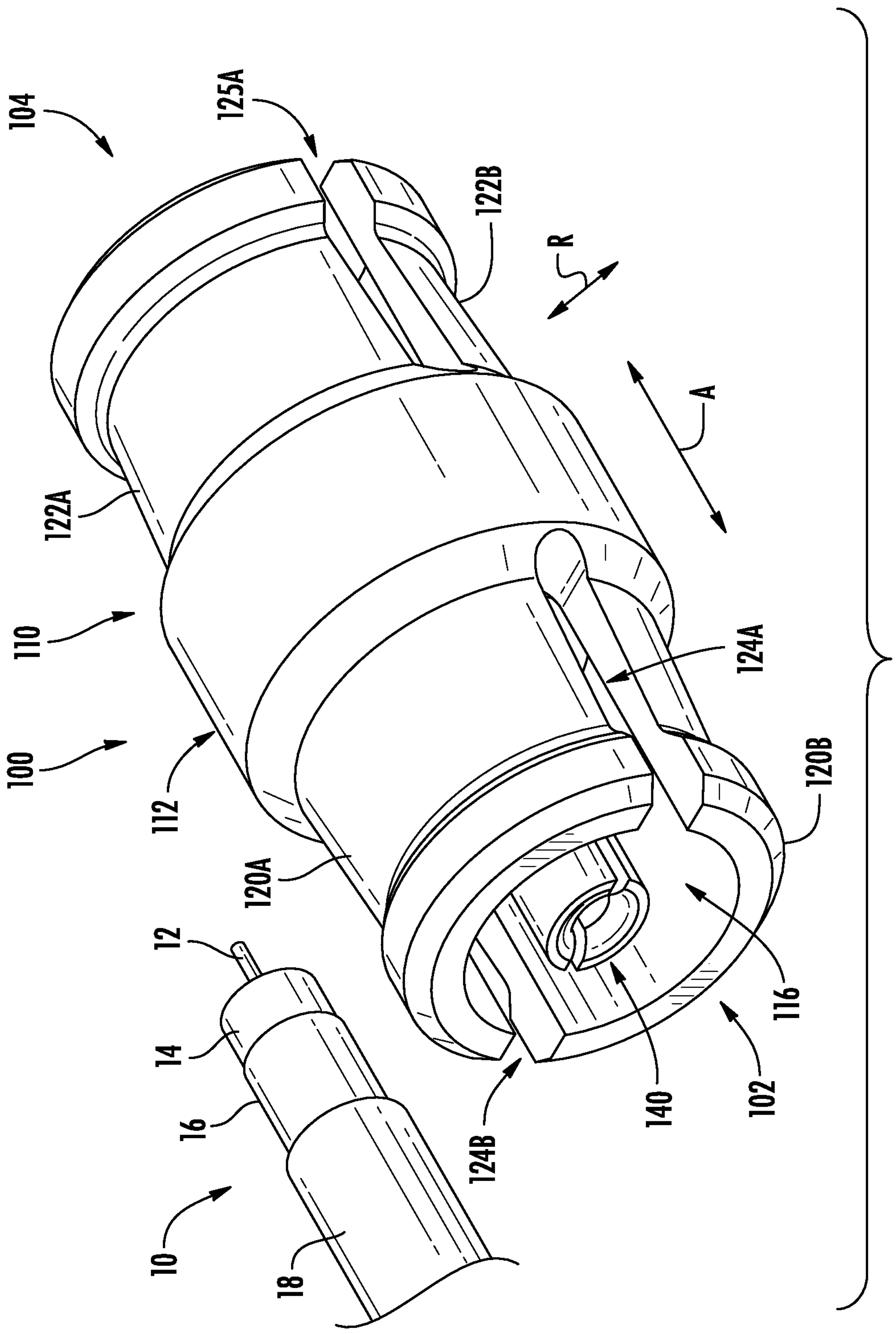
FIG. 1A schematically depicts a perspective view of a coaxial connector and a coaxial transmission medium, according to one or more embodiments shown and described herein.

Now referring to FIG. 1A, a perspective view of a coaxial transmission medium 10 and a coaxial connector 100 are schematically depicted. The coaxial transmission medium 10 generally includes an inner conductor 12 surrounded by a dielectric material 14. In embodiments, electrical signals, such as microwave signals, may be passed through the inner conductor 12, and the inner conductor 12 may be formed of a conductive material, such as copper, aluminum, brass, gold, an alloy including various combinations thereof, or the like. The dielectric material 14 generally electrically insulates the inner conductor 12, and may include a polymer or the like. In some embodiments, the dielectric material 14 is elastic such that the dielectric material 14 may elastically deform under force, thereby allowing the coaxial transmission medium 10 to bend.

In embodiments, the coaxial transmission medium 10 further includes an outer conductor 16 surrounding the dielectric material 14. In some configurations, the outer conductor 16 may be maintained at a ground potential while electrical signals are transmitted through the inner conductor 12. The outer conductor 16 may be formed of a conductive material, such as aluminum foil, copper foil, brass foil, gold foil, an alloy foil including various combinations thereof, and/or a braided copper, braided aluminum, braided brass, braided gold, a braided alloy including various combinations thereof, or the like. The coaxial transmission medium 10, in embodiments, further includes an outer jacket 18 surrounding at least a portion of the outer conductor 16. The outer jacket 18 may be formed of a polymer or the like and may generally protect the coaxial transmission medium 10 from environmental elements, such as moisture.

Figure 1B:
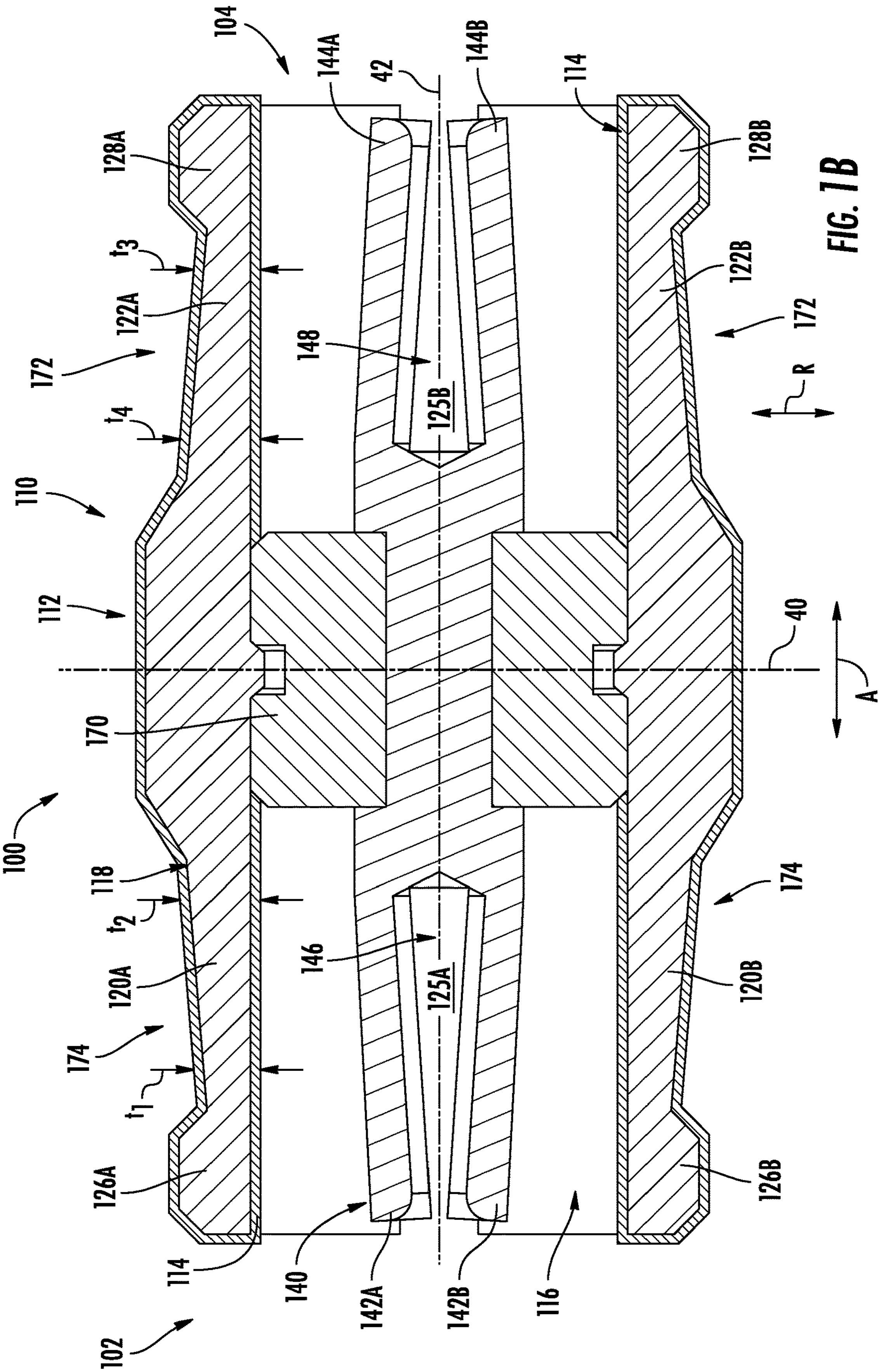
FIG. 1B schematically depicts a section view the coaxial connector of FIG. 1A, according to one or more embodiments shown and described herein.

Referring to FIG. 1B, a section view of the coaxial connector 100 is schematically depicted. The coaxial connector 100 generally includes an outer conductor portion 110 and an inner conductor portion 140. The outer conductor portion 110 includes an outer shell 112 that extends in the axial direction A between a first open end 102 and a second open end 104. The outer shell 112 generally defines an inner bore 116 that extends from the first open end 102 to the second open end 104. In embodiments, the first open end 102 and the second open end 104 are opposite one another in the axial direction A. In some embodiments, the outer shell 112 is formed from a polymer or the like, and can be formed through any suitable manufacturing process, for example through molding, extrusion, or the like.

The coaxial connector 100 further includes a conductive layer 114 positioned on at least one of the inner bore 116 of the outer shell 112 and an outer surface 118 of the outer shell 112. In embodiments, the conductive layer 114 is structurally configured to be electrically coupled to the outer conductor 16 of the coaxial transmission medium 10, as described in greater detail herein. While in the embodiment depicted in FIG. 1B, the conductive layer 114 is positioned on both the inner bore 116 of the outer shell 112 and the outer surface 118 of the outer shell 112, it should be understood that this is merely in example. In some embodiments, the conductive layer 114 may also extend over only one of the inner bore 116 or the outer surface 118 to electrically couple outer conductors of opposing coaxial transmission mediums inserted into the first open end 102 and the second open end 104 of the outer shell 112. In embodiments, the conductive layer 114 may be formed from a conductive material, for example and without limitation, copper, aluminum, brass, gold, an alloy including various combinations thereof, or the like. The conductive layer 114, in embodiments, can be applied to the outer shell 112 through any suitable process, for example and without limitation, chemical deposition such as electroplating, chemical solution or chemical bath deposition, spin coating, dip coating, chemical vapor deposition, atomic layer deposition, molecular layer deposition, or the like. The conductive layer 114 may also or alternatively be applied to the outer shell 112 by physical deposition, such as molecular beam epitaxy, sputtering, pulsed laser deposition, ion beam deposition, cathodic arc deposition, or the like.

In the embodiment depicted in FIGS. 1A and 1B, the first open end 102 includes at least two deformable portions that are elastically deformable in the radial direction R. For example, in the embodiment depicted in FIGS. 1A and 1B, the first open end 102 includes an upper deformable portion 120A and lower deformable portion 120B.

As shown in FIG. 1B, the centerline 40 bisects the coaxial connector 100 in the axial direction, and the coaxial connector 100 is generally symmetric about the centerline 40 such that the first open end 102 and the second open end 104 are mirror images of one another. For example, in the embodiment depicted in FIGS. 1A and 1B, the second open end 104 includes an upper deformable portion 122A and a lower deformable portion 122B. While the upper deformable portions 120A, 122A are described and depicted as being above the lower deformable portions 120B, 122B, it should be understood that the upper deformable portions 120A, 122A and the lower deformable portions 120B, 122B may have any suitable orientation with respect to one another. The designations of "upper" deformable portions 120A, 122A and "lower" deformable portion 120B, 122B are merely intended to clarify that the upper deformable portions 120A, 122A and the lower deformable portion 120B, 122B are separate and discrete from one another around a perimeter of the outer shell 112. Moreover, while the embodiment depicted in FIGS. 1A and 1B includes the upper deformable portion 120A and the lower deformable portion 120B at the first open end 102 and the upper deformable portion 122A and the lower deformable portion 122B at the second open end 104, it should be understood that the first open end 102 and the second open end 104 can have any suitable number of discrete deformable portions. Further, while in the embodiment depicted in FIG. 1B, the coaxial connector 100 is symmetric about the centerline 40, it should be understood that in some embodiments, the coaxial connector 100 is asymmetrical about the centerline 40.

In some embodiments, at the first open end 102, the upper deformable portion 120A terminates at an outwardly-extending flange 126A, and the lower deformable portion 120B terminates at an outwardly-extending flange 126B. Similarly, at the second open end 104, the upper deformable portion 122A terminates at an outwardly-extending flange 128A, and the lower deformable portion 122B terminates at an outwardly-extending flange 128B.

In some embodiments, the upper deformable portion 120A and the lower deformable portion 120B are separated by at least two slots extending from the first open end 102 along the axial direction A. For example and as best shown in FIG. 1A, the coaxial connector 100 defines a pair of slots 124A, 124B that separate the upper deformable portion 120A and the lower deformable portion 120B. Similarly, the upper deformable portion 122A and the lower deformable portion 122B at the second open end 104 are separated by at least two slots extending from the second open end 104 along the axial direction A. For example, the upper deformable portion 122A and the lower deformable portion 122B at the second open end 104 are separated by a slot 125A shown in the perspective view of FIG. 1A, and another slot 125B, shown in the section view of FIG. 1B.

Referring to FIG. 1B, in some embodiments, the outer surface 118 of the outer shell 112 defines an inwardly-extending taper 174 that tapers inward in the radial direction R at the first open end 102. For example, as shown in the embodiment depicted in FIG. 1B, the outer shell 112 defines a first thickness t1 at a first axial position, and a second thickness t2 at a second axial position positioned closer to the centerline 40 than the first axial position. Similarly, the outer surface 118 of the outer shell 112 defines an inwardly-extending taper 172 that tapers inward at the second open end 104 in the radial direction R. For example, as shown in the embodiment depicted in FIG. 1B, the outer shell 112 defines a third thickness t3 at a third axial position, and a fourth thickness t4 at a fourth axial position that is positioned closer to the centerline 40 than the third axial position. The inwardly-extending tapers 174, 172 may assist in allowing the outer shell 112 to selectively deform in the radial direction R, as described in greater detail herein.

In embodiments, the inner conductor portion 140 is positioned at least partially within the inner bore 116 of the outer shell 112. For example, in the embodiment depicted in FIG.

1B, the coaxial connector 100 includes an intermediate member 170 engaged with the inner bore 116 of the outer shell 112 and the inner conductor portion 140. The intermediate member 170 may be formed of an electrically-insulating material, such as a polymer or the like, and the intermediate member 170 may electrically isolate the inner conductor portion 140 from the conductive layer 114 on the outer shell 112. The inner conductor portion 140 generally extends between the first open end 102 of the outer shell 112 and the second open end 104 of the outer shell 112. In some embodiments, the inner conductor portion 140 defines a first inner conductor bore 146 at the first open end 102 of the outer shell 112. The inner conductor portion 140 may also define a second inner conductor bore 148 at the second open end 104 of the outer shell 112. In some embodiments, the first inner conductor bore 146 is at least partially defined by opposing fingers 142A, 142B. Similarly, in some embodiments, the second inner conductor bore 148 is at least partially defined by opposing fingers 144A, 144B.

Figure 1C:
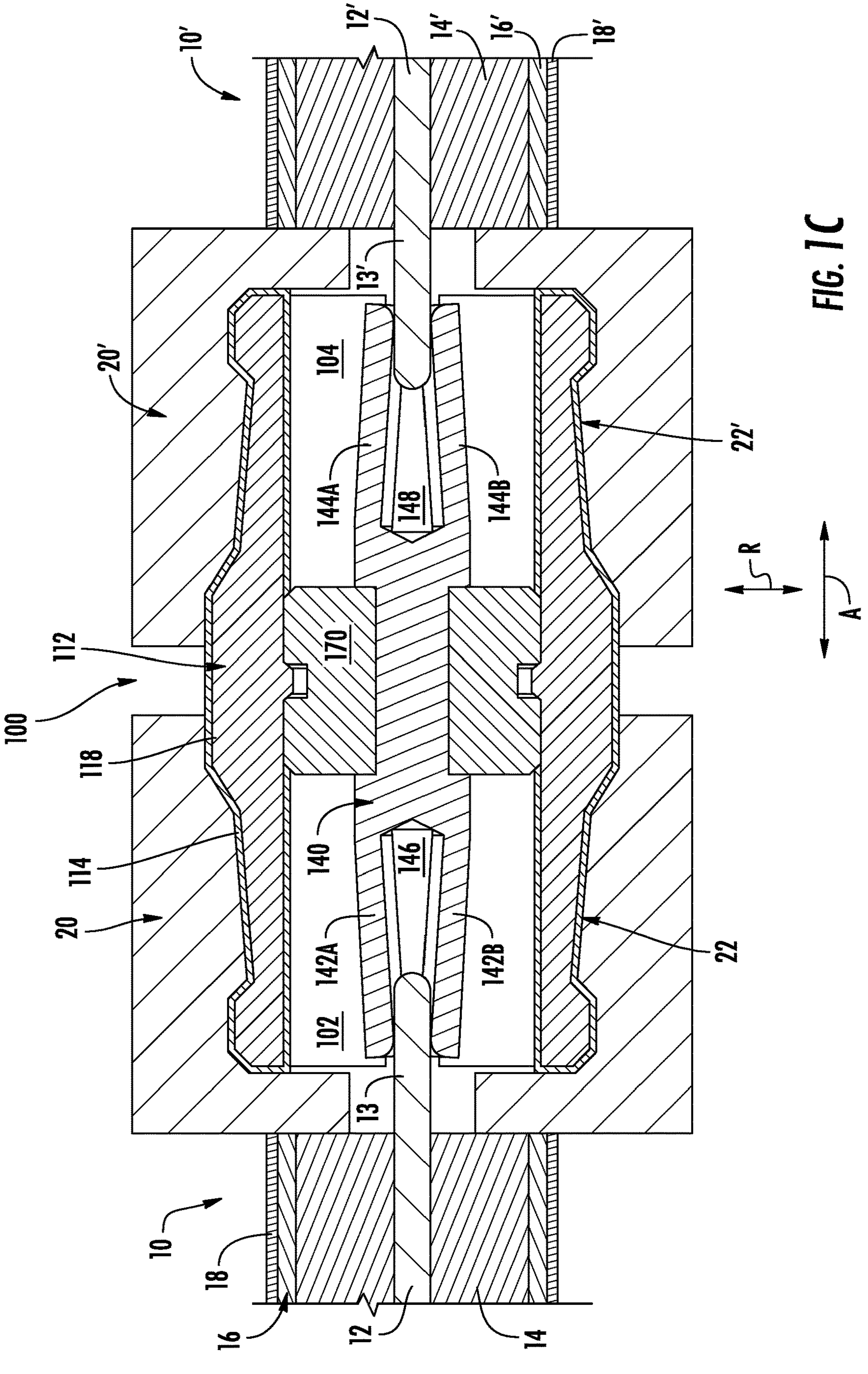
FIG. 1C schematically depicts a section view of the coaxial connector of FIG. 1A with coaxial transmission mediums inserted at least partially into the coaxial connector, according to one or more embodiments shown and described herein.

Referring to FIG. 1C, the inner conductor portion 140 is structurally configured to be electrically coupled to inner conductor 12 of the coaxial transmission medium 10, as the coaxial transmission medium 10 is inserted into the first open end 102 of the outer shell 112. For example, in some embodiments, the inner conductor 12 may be electrically coupled to a pin 13 that is at least partially inserted into the inner conductor portion 140, thereby electrically coupling the inner conductor 12 to the inner conductor portion 140. In some embodiments, the opposing fingers 142A, 142B of the inner conductor portion 140 may deform outwardly in the radial direction R, elastically engaging the pin 13 inserted into the first open end 102 of the outer shell 112. In some embodiments and as shown in FIG. 1C, the inner conductor portion 140 may also be structurally configured to be electrically coupled to an inner conductor 12' of an opposing coaxial transmission medium 10' inserted into the second open end 104 of the outer shell 112. In the embodiment depicted in FIG. 1C, the inner conductor 12' is electrically coupled to a pin 13' that is at least partially inserted into the inner conductor portion 140, thereby electrically coupling the inner conductor 12' to the inner conductor portion 140. More particularly, the opposing fingers 144A, 144B of the inner conductor portion 140 may deform outwardly in the radial direction R, elastically engaging the pin 13' inserted into the second open end 104 of the outer shell 112. Through inner conductor portion 140, electrical signals can be sent between the inner conductor 12 of the coaxial transmission medium 10 at the first open end 102 and the inner conductor 12' of the coaxial transmission medium 10' at the second open end 104. While in the embodiment depicted in FIG. 1C, the inner conductors 12, 12' of the coaxial transmission medium 10, 10' are electrically coupled to the pins 13, 13', it should be understood that this is merely an example, and the inner conductors 12, 12' of the coaxial transmission medium 10, 10' may be directly inserted at least partially into the inner conductor portion 140.

In some embodiments, the coaxial transmission medium 10 at the first open end 102 is electrically coupled to a terminal housing 20. For example, the coaxial transmission medium 10 may terminate at the terminal housing 20, and the outer conductor 16 of the coaxial transmission medium 10 may be electrically coupled to the terminal housing 20. The terminal housing 20 may define a housing cavity 22 that has a shape that is complementary with the outer surface 118 of the outer shell 112.

Similarly, the coaxial transmission medium 10' at the second open end 104 is electrically coupled to a terminal housing 20'. The coaxial transmission medium 10' may terminate at the terminal housing 20', and the outer conductor 16' of the coaxial transmission medium 10' may be electrically coupled to the terminal housing 20'. The terminal housing 20' may define a housing cavity 22' that has a shape that is complementary with the outer surface 118 of the outer shell 112 at the second open end 104. In embodiments, the terminal housings 20, 20' may be formed of any suitable material for conducting electrical signals, for example and without limitation, copper, aluminum, brass, gold, an alloy including combinations thereof, or the like.

In embodiments, the outer conductor 16 of the coaxial transmission medium 10 at the first open end 102 is electrically coupled to the conductive layer 114 of the coaxial connector 100. For example in the embodiment depicted in FIG. 1C, the outer conductor 16 is electrically coupled to the conductive layer 114 through the terminal housing 20. Similarly, the outer conductor 16' of the coaxial transmission medium 10 at the second open end 104 is electrically coupled to the conductive layer 114 of the coaxial connector 100. In the embodiment depicted in FIG. 1C, the outer conductor 16' of the coaxial transmission medium 10' at the second open end 104 is electrically coupled to the conductive layer 114 of the coaxial connector 100 through the terminal housing 20'. In this way, the outer conductors 16, 16' of the opposing coaxial transmission mediums 10, 10' are electrically coupled to one another through the conductive layer 114 and the respective terminal housings 20, 20'.

In some embodiments, the terminal housings 20, 20' may elastically deform the outer shell 112 when positioned around the outer shell 112 at the first open end 102 and the second open end 104, respectively. For example and referring to FIG. 1D, a perspective view of the first open end 102 of the outer shell 112 is schematically depicted. While reference is made herein the first open end 102 of the outer shell 112 depicted in FIG. 1D, it should be understood that the second open end 104 may perform in the same manner.

When the terminal housing 20 is installed around the first open end 102 of the outer shell 112, the terminal housing 20 (FIG. 1C) may compress the upper deformable portion 120A and the lower deformable portion 120B toward one another. In some embodiments, the upper deformable portion 120A and the lower deformable portion 120B may contact one another when installed into the terminal housing 20 (FIG. 1C). Contact between the upper deformable portion 120A and the lower deformable portion 120B may electrically couple the conductive layer 114 on the upper deformable portion 120A and the conductive layer 114 on the lower deformable portion 120B. Without being bound by theory, electrical continuity between the upper deformable portion 120A and the lower deformable portion 120B may reduce reflection loss of electrical signals transmitted through the conductive layer 114 from the first open end 102 to the second open end 104 of the coaxial connector 100. Reduction of reflection loss through the conductive layer 114 thereby reduces reflection loss of electrical signals transmitted between the outer conductor 16 (FIG. 1C) at the first open end 102 to the outer conductor 16' (FIG. 1C) at the second open end 104 via the conductive layer 114.

Figure 1D:
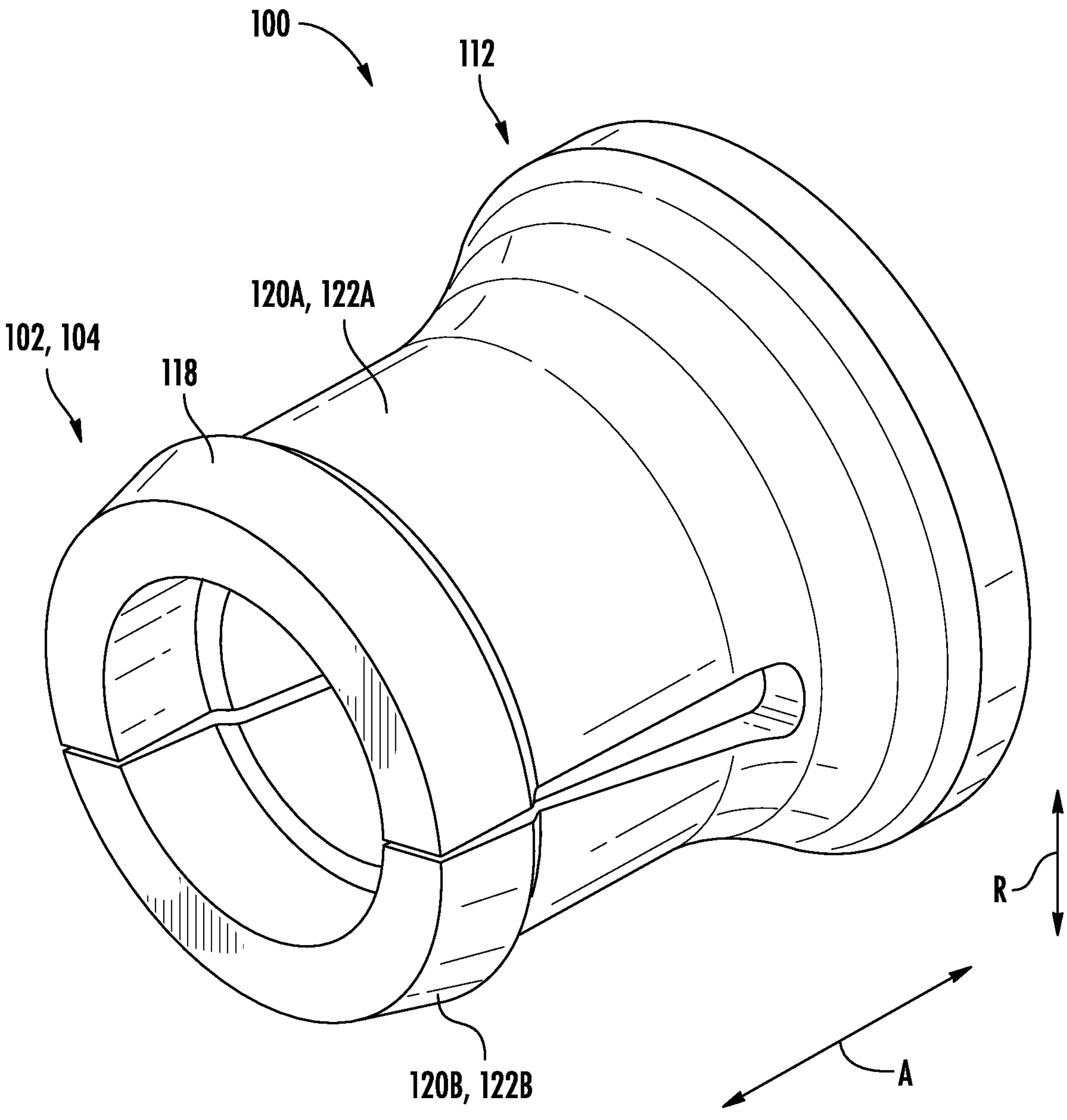
FIG. 1D schematically depicts a perspective view of the coaxial connector of FIG. 1A at least partially deformed, according to one or more embodiments shown and described herein.

As noted above, in embodiments described herein, the outer shell 112 may be formed of a material such as a polymer or the like. The material of the outer shell 112, as well as the geometry of the outer shell 112, (e.g., the tapers 172, 174 (FIG. 1B), the outwardly-extending flanges 126A, 126B, 128A, 128B (FIG. 1B)), are selected assist in allowing the outer shell 112 to elastically deform and form electrical continuity between the upper deformable portions 120A, 122A and the respective lower deformable portions 120B, 122B. Through selective deformation of the outer shell 112, coaxial connectors 100 according to the present disclosure may have less reflection loss as compared to conventional coaxial connectors. For example, conventional coaxial connectors may include shells formed of monolithic metal, which can be difficult to deform in an elastic matter and/or retain in compression as shown in FIG. 1D. In these conventional coaxial connectors, deformable portions of the coaxial connectors do not generally contact one another when engaged with terminal housings of a coaxial transmission medium, and accordingly, reflection loss across conventional coaxial connectors may be higher than reflection loss across the conductive layer 114 of coaxial connectors 100 of the present disclosure.

Furthermore, the cost of manufacturing coaxial connectors 100 of the present disclosure may be reduced as compared to conventional coaxial connectors. For example, conventional monolithic metal coaxial connectors may be formed via a machining process, which can be time consuming and costly when manufacturing in significant volumes. Additionally, machining processes generally create significant material waste (e.g., machining chips/scrap) that can be difficult to recapture. By contrast, by forming the outer shell 112 of coaxial connectors 100 of materials that can be formed in molding processes, such as polymers, and subsequently applying the conductive layer 114, manufacturing costs and material waste of coaxial connectors 100 of the present disclosure can be reduced as compared to conventional coaxial connectors.

Figure 2:
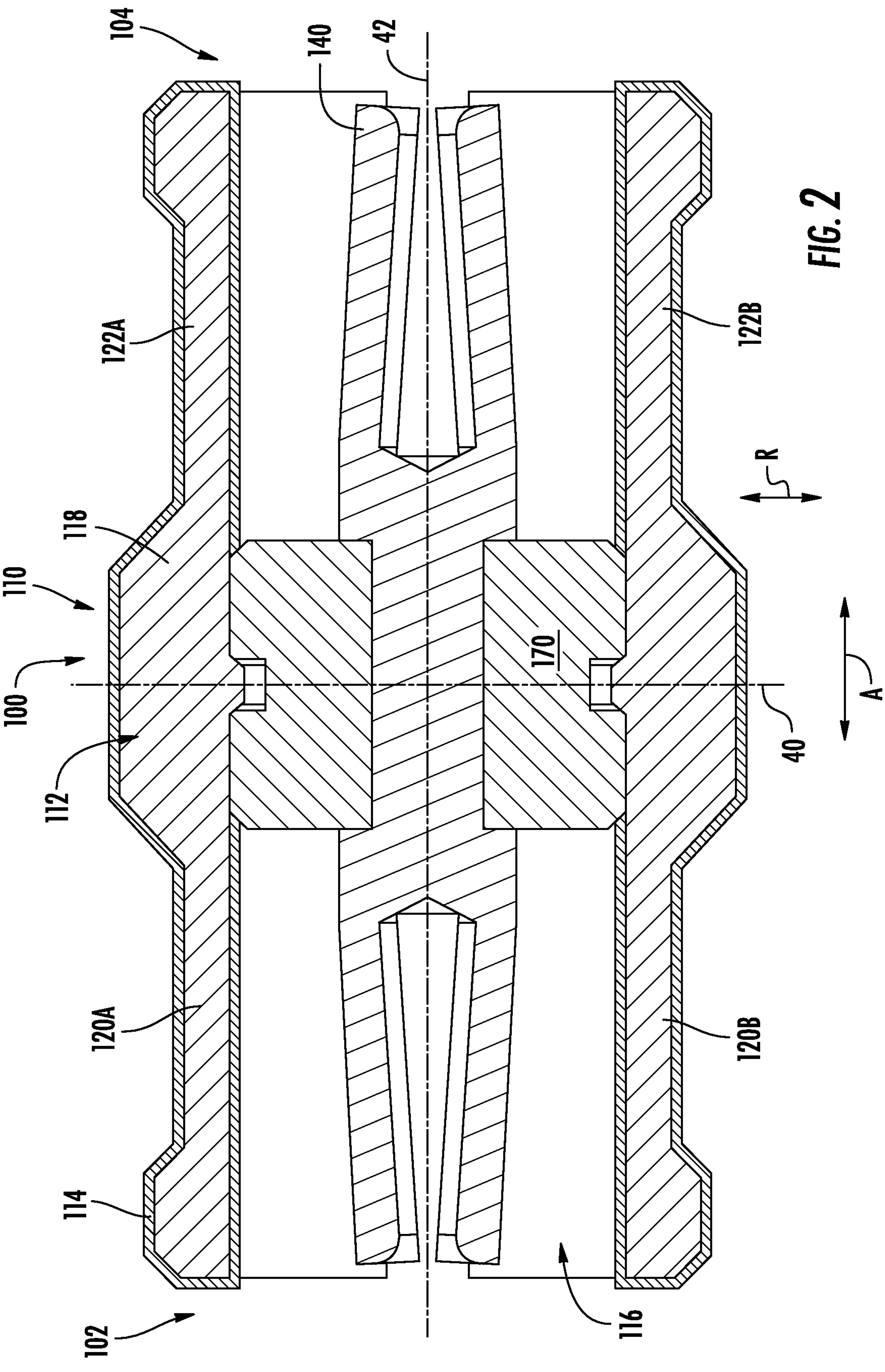
FIG. 2 schematically depicts a section view of another coaxial connector, according to one or more embodiments shown and described herein.

Referring to FIG. 2, a section view of another coaxial connector 100 is depicted. Similar to the embodiment depicted in FIGS. 1A-1D, the coaxial connector 100 includes the inner conductor portion 140 and the outer conductor portion 110 including the outer shell 112. However, in the embodiment depicted in FIG. 2, the outer shell 112 does not include the inwardly-extending tapers 174, 172 (FIG. 1B). Without being bound by theory, the shape of the outer shell 112 impacts the relationship between stress and strain as force is applied to the outer shell 112, thereby influencing the manner in which the outer shell 112 elastically deforms under force. The thickness of the outer shell 112 may be tailored such that the upper deformable portions 120A, 122A and the lower deformable portions 120B, 122B may elastically deform inward as desired when engaged with the terminal housings 20, 20' (FIG. 1C).

Figure 3:
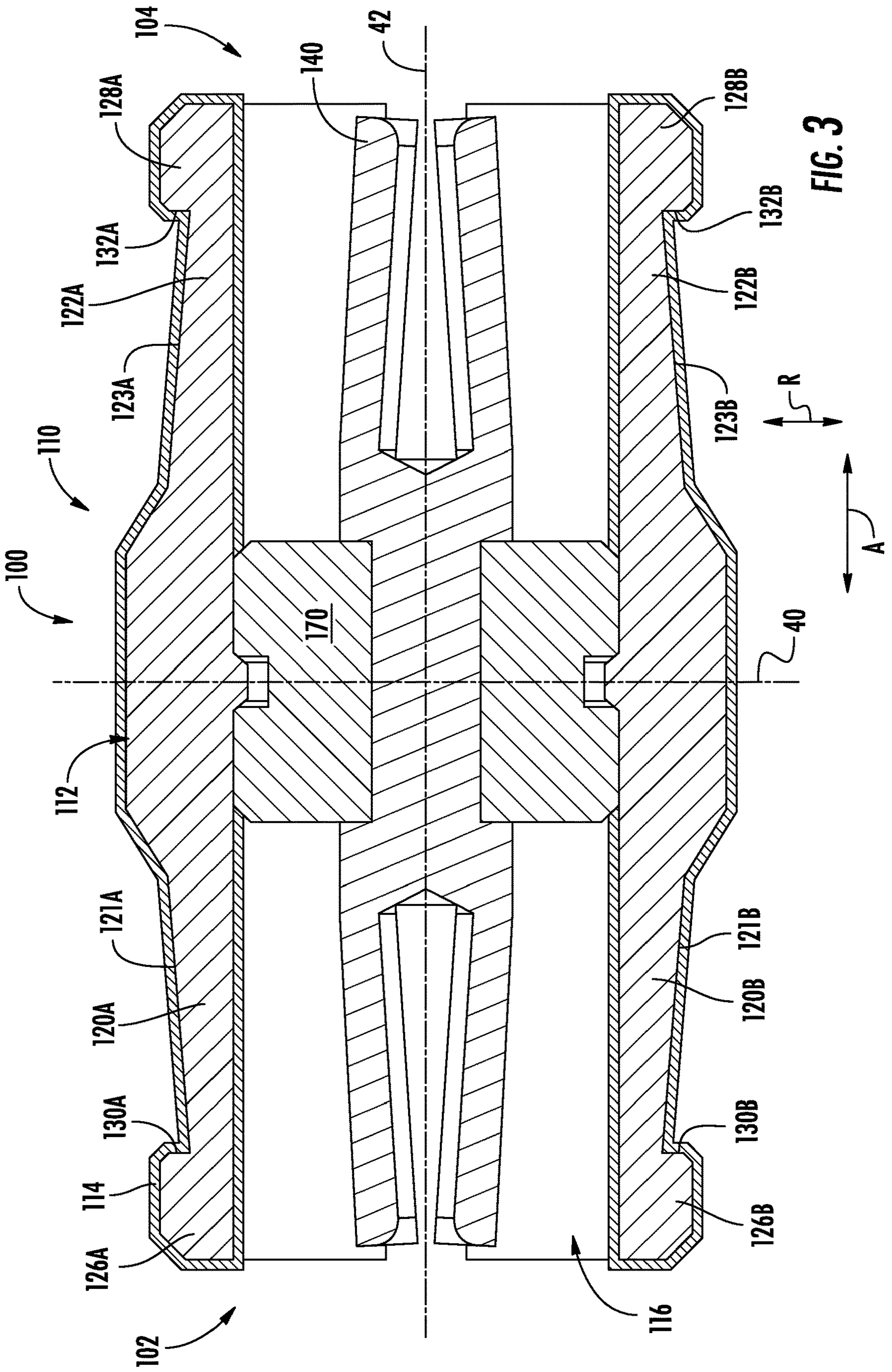
FIG. 3 schematically depicts a section view of another coaxial connector, according to one or more embodiments shown and described herein.

Referring to FIG. 3, a section view of another coaxial connector 100 is depicted. Similar to the embodiment depicted in FIGS. 1A-2, the coaxial connector 100 includes the inner conductor portion 140 and the outer conductor portion 110 including the outer shell 112. However, in the embodiment depicted in FIG. 3, one or more of the outwardly-extending flanges 126A, 126B, 128A, 128B define an inwardly-facing surface that faces in the axial direction A. For example, in the embodiment depicted in FIG. 3, the outwardly-extending flange 126A of the upper deformable portion 120A at the first open end 102 includes an inwardly-facing surface 130A. Similarly, the outwardly-extending flange 126B of the lower deformable portion 120B at the first open end 102 includes an inwardly-facing surface 130B. Likewise, the outwardly-extending flange 128A of the upper deformable portion 122A at the second open end 104 includes an inwardly-facing surface 132A, and the outwardly-extending flange 128B of the lower deformable portion 122B at the second open end 104 includes an inwardly-facing surface 132B. In some embodiments, one or more of the inwardly-facing surfaces 130A, 130B, 132A, and 132B may be transverse to an adjacent surface of the outer shell 112 positioned axially inward of the inwardly-facing surfaces 130A, 130B, 132A, and 132B. For example, the inwardly-facing surface 130A at the first open end 102 is transverse to an adjacent surface 121A that is positioned axially inward of the inwardly-facing surface 130A. Similarly, the inwardly-facing surface 130B at the first open end 102 is transverse to an adjacent surface 121B that is positioned axially inward of the inwardly-facing surface 130B. Likewise, the inwardly-facing surface 132A at the second open end 104 is transverse to an adjacent surface 121A that is positioned axially inward of the inwardly-facing surface 130A, and the inwardly-facing surface 132B at the second open end 104 is transverse to an adjacent surface 121B that is positioned axially inward of the inwardly-facing surface 130A. In some embodiments, one or more of the inwardly-facing surfaces 130A, 130B, 132A, and 132B may be orthogonal to an adjacent surface of the outer surface 118 positioned axially inward of the inwardly-facing surfaces 130A, 130B, 132A, and 132B. The outwardly-extending flanges 126A, 126B, 128A, 128B that define the inwardly-facing surface 130A, 130B, 132A, and 132B, respectively, may allow preferential deformation of the outer shell 112 when the coaxial connector 100 is installed to the terminal housings 20, 20' (FIG. 1C).

Figure 4:
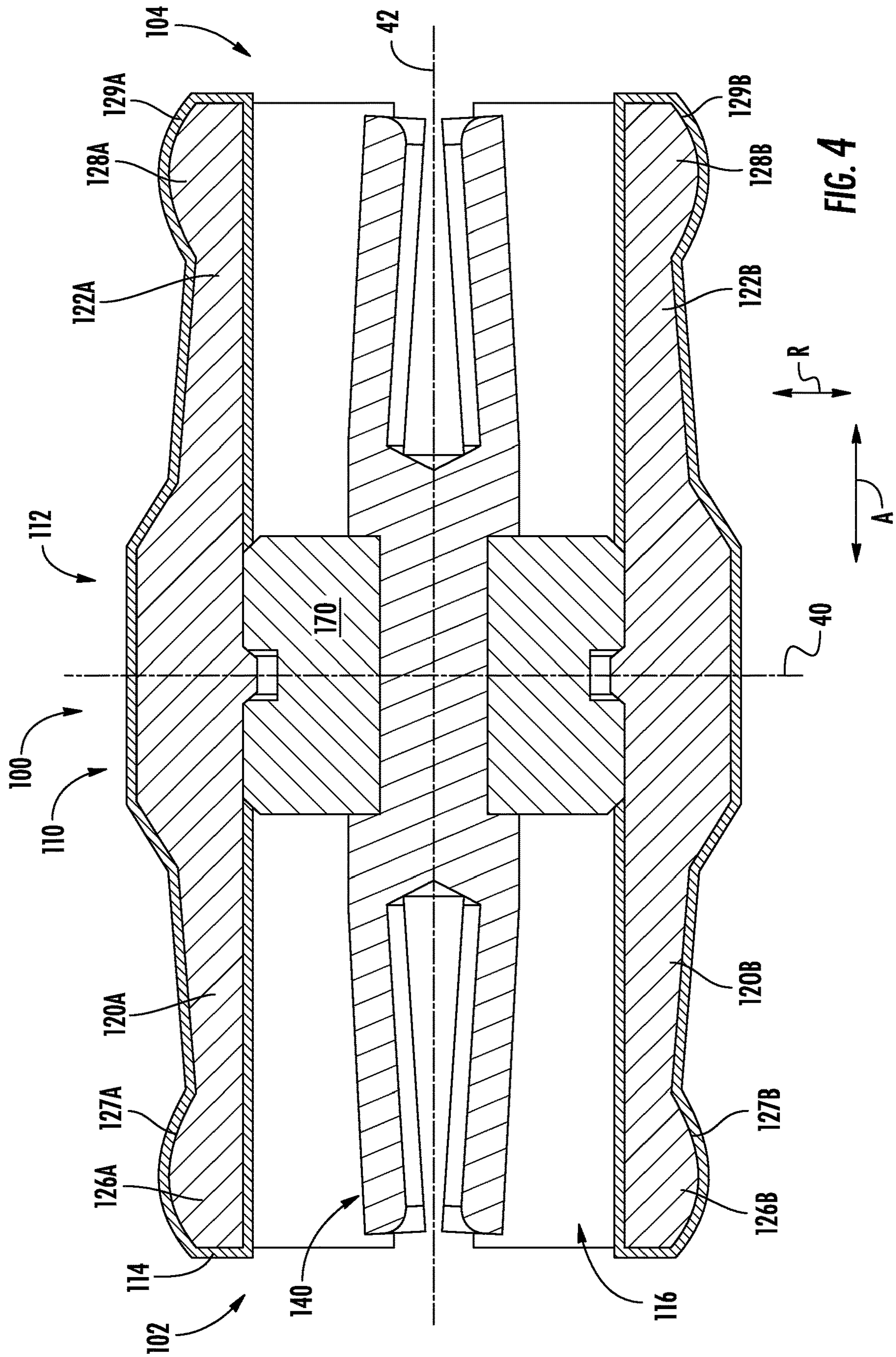
FIG. 4 schematically depicts a section view of another coaxial connector, according to one or more embodiments shown and described herein.

Referring to FIG. 4, a section view of another coaxial connector 100 is schematically depicted. Similar to the embodiments depicted in FIGS. 1A-3, the coaxial connector 100 includes the inner conductor portion 140 and the outer conductor portion 110 including the outer shell 112. However, in the embodiment depicted in FIG. 4, the outwardly-extending flanges 126A, 126B, 128A, 128B define a rounded surface. For example, the outwardly-extending flange 126A at the first open end 102 defines a rounded surface 127A, and the outwardly-extending flange 126B at the first open end 102 defines a rounded surface 127B. Similarly, the outwardly-extending flange 128A at the second open end 104 defines a rounded surface 129A, and the outwardly-extending flange 128B at the second open end 104 defines a rounded surface 129B. The outwardly-extending flanges 126A, 126B, 128A, 128B that define the rounded surfaces 127A, 127B, 129A, and 129B, respectively, may allow preferential deformation of the outer shell 112 when the coaxial connector 100 is installed into the terminal housings 20, 20' (FIG. 1C).

Figure 5:
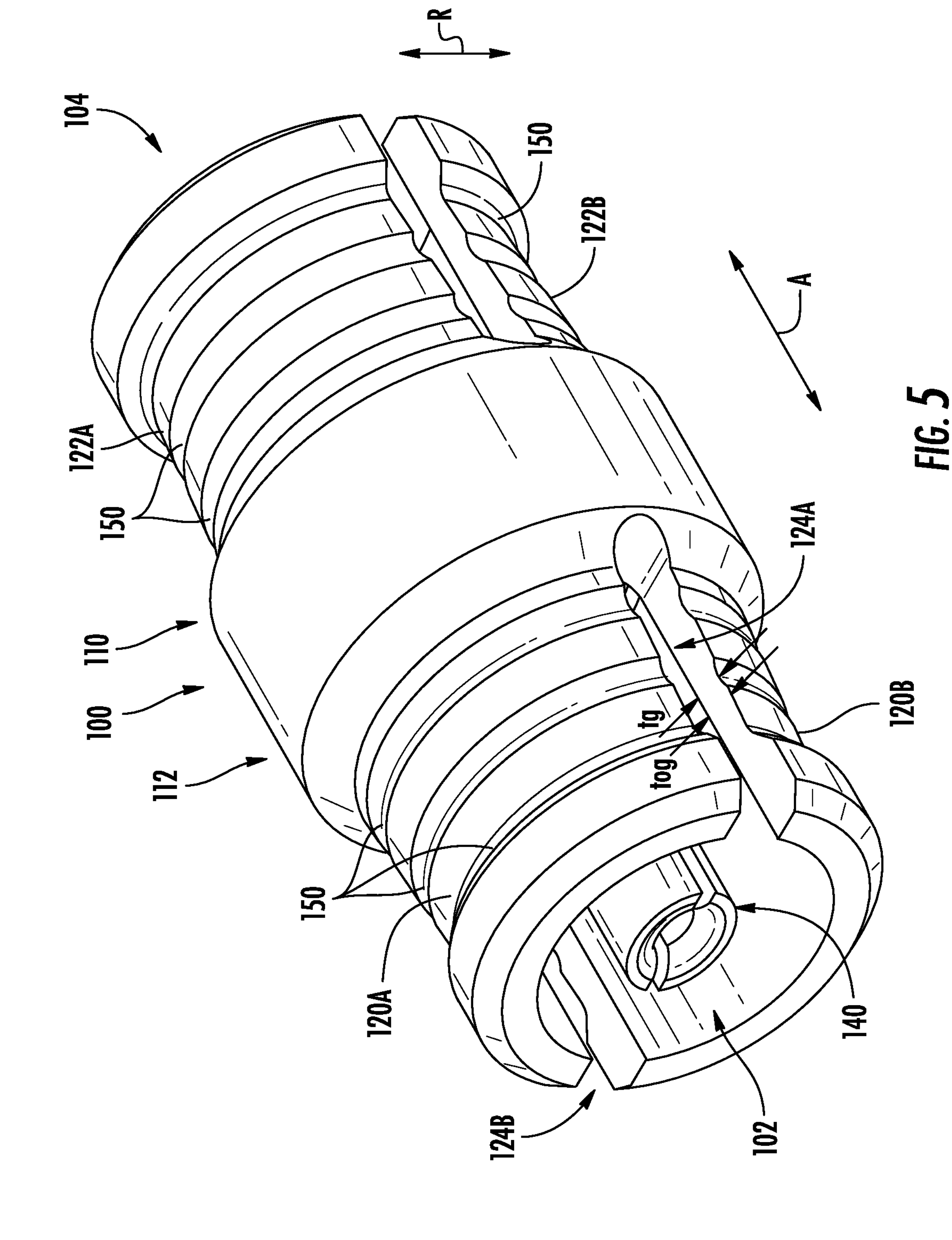
FIG. 5 schematically depicts a perspective view of another coaxial connector, according to one or more embodiments shown and described herein.

Referring to FIG. 5, a perspective view of another coaxial connector 100 is schematically depicted. Similar to the embodiments depicted in FIGS. 1A-4, the coaxial connector 100 includes the inner conductor portion 140 and the outer conductor portion 110 including the outer shell 112. However, in the embodiment depicted in FIG. 5, the outer surface 118 defines one or more inwardly-extending grooves 150. A thickness $t_g$ of the outer shell 112 at the one or more inwardly-extending grooves 150 may be less than a thickness $t_{og}$ of the outer shell 112 adjacent to and outside of the one or more inwardly-extending grooves 150. The inwardly-extending grooves 150 may allow preferential deformation of the outer shell 112 when the coaxial connector 100 is installed into the terminal housings 20, 20' (FIG. 1C).

Figure 6:
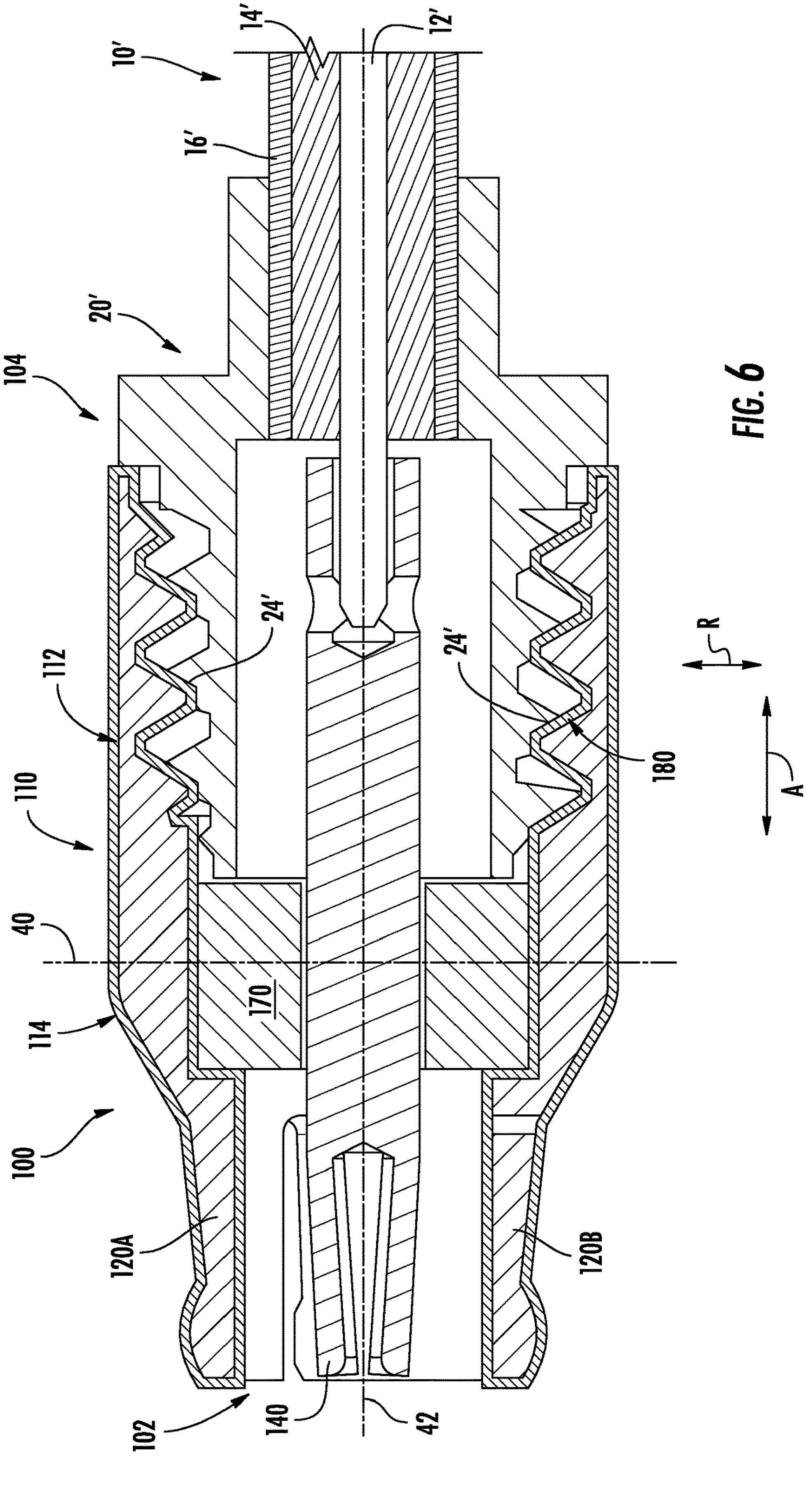
FIG. 6 schematically depicts a section view of another coaxial connector, according to one or more embodiments shown and described herein.

Referring to FIG. 6, a section view of another coaxial connector 100 is schematically depicted. Similar to the embodiments depicted in FIGS. 1A-5, the coaxial connector 100 includes the inner conductor portion 140 and the outer conductor portion 110 including the outer shell 112 and the conductive layer 114. However, in the embodiment depicted in FIG. 6, the second open end 104 of the outer shell 112 does not include the upper deformable portion 122A (FIG.

4) or the lower deformable portion 122B (FIG. 4). Instead, in the embodiment depicted in FIG. 6, the outer shell 112 defines a thread 180 at the second open end 104. The thread 180 at the second open end 104 may interface with corresponding threads 24' of the terminal housing 20' to connect the coaxial transmission medium 10' to the coaxial connector 100.

Accordingly, it should now be understood that embodiments described herein are generally directed to coaxial connectors including an outer shell including deformable portions that allowing the outer shell to elastically deform and form electrical continuity between the deformable portions when engaged with a terminal housing of a coaxial transmission medium. Through selective deformation of the outer shell, coaxial connectors according to the present disclosure may have less reflection loss as compared to conventional coaxial connectors. In some embodiments, the outer shell of coaxial connectors according the present disclosure are formed of materials that can be formed in molding processes, such as polymers and the like, reducing manufacturing costs and material waste as compared to conventional coaxial connectors.

Having described the subject matter of the present disclosure in detail and by reference to specific embodiments, it is noted that the various details described in this disclosure should not be taken to imply that these details relate to elements that are essential components of the various embodiments described in this disclosure, even in cases where a particular element is illustrated in each of the drawings that accompany the present description. Rather, the appended claims should be taken as the sole representation of the breadth of the present disclosure and the corresponding scope of the various embodiments described in this disclosure. Further, it should be apparent to those skilled in the art that various modifications and variations can be made to the described embodiments without departing from the spirit and scope of the claimed subject matter. Thus it is intended that the specification cover the modifications and variations of the various described embodiments provided such modification and variations come within the scope of the appended claims and their equivalents.

It is noted that recitations herein of a component of the present disclosure being "structurally configured" in a particular way, to embody a particular property, or to function in a particular manner, are structural recitations, as opposed to recitations of intended use. More specifically, the references herein to the manner in which a component is "structurally configured" denotes an existing physical condition of the component and, as such, is to be taken as a definite recitation of the structural characteristics of the component.

It is noted that terms like "preferably," "commonly," and "typically," when utilized herein, are not utilized to limit the scope of the claimed invention or to imply that certain features are critical, essential, or even important to the structure or function of the claimed invention. Rather, these terms are merely intended to identify particular aspects of an embodiment of the present disclosure or to emphasize alternative or additional features that may or may not be utilized in a particular embodiment of the present disclosure.

For the purposes of describing and defining the present invention it is noted that the terms "substantially" and "about" are utilized herein to represent the inherent degree of uncertainty that may be attributed to any quantitative comparison, value, measurement, or other representation. The terms "substantially" and "about" are also utilized herein to represent the degree by which a quantitative representation may vary from a stated reference without resulting in a change in the basic function of the subject matter at issue.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

The invention claimed is:

1. A coaxial connector, comprising:

an outer conductor portion, comprising:

a polymer shell extending in an axial direction, the polymer shell defining an inner bore extending from a first open end to a second open end opposite the first open end, wherein the first open end comprises at least two deformable portions that are elastically deformable in a radial direction transverse to the axial direction;

a conductive layer positioned on the inner bore of the polymer shell and an outer surface of the polymer shell, wherein the conductive layer continuously wraps around an end of the at least two deformable portions of the polymer shell from the inner bore to the outer surface, the conductive layer being structurally configured to be electrically coupled to an outer conductor of a coaxial transmission medium;

an electrically-insulating intermediate member positioned at least partially within the inner bore of the polymer shell; and an inner conductor portion engaged with the electrically-insulating intermediate member and positioned at least partially within the inner bore of the polymer shell, wherein the inner conductor portion is configured to be electrically coupled to an inner conductor of the coaxial transmission medium and electrically isolated from the conductive layer of the outer conductor portion.

2. The coaxial connector of claim 1, wherein the at least two deformable portions are separated by at least two slots extending from the first open end along the axial direction.

3. The coaxial connector of claim 1, wherein the outer surface defines an inwardly extending taper.

4. The coaxial connector of claim 1, wherein the inner conductor portion defines a first inner conductor bore at the first open end and a second inner conductor bore at the second open end.

5. The coaxial connector of claim 1, wherein the polymer shell defines an outwardly-extending flange at the first open end.

6. The coaxial connector of claim 5, wherein the outwardly-extending flange defines a rounded surface.

7. The coaxial connector of claim 5, wherein the outwardly-extending flange defines an inwardly-facing surface that faces in the axial direction.

8. The coaxial connector of claim 5, wherein the outwardly-extending flange defines an inwardly-facing surface orthogonal to an adjacent surface of the polymer shell.

9. The coaxial connector of claim 1, wherein the outer surface defines one or more inwardly-extending grooves.

10. The coaxial connector of claim 1, wherein the polymer shell defines a thread at the second open end.

11. A coaxial connector, comprising:

an outer conductor portion, comprising:

an outer shell extending in an axial direction, the outer shell defining an inner bore extending from a first open end to a second open end opposite the first open end, wherein the first open end comprises at least two deformable portions that are elastically deformable in a radial direction transverse to the axial direction;

a conductive layer positioned on the inner bore of the polymer shell and an outer surface of the polymer shell, wherein the conductive layer continuously wraps around an end of the at least two deformable portions of the polymer shell from the inner bore to the outer surface, the conductive layer being structurally configured to be electrically coupled to an outer conductor of a coaxial transmission medium;

an electrically-insulating intermediate member positioned at least partially within the inner bore of the outer shell; and an inner conductor portion engaged with the electrically-insulating intermediate member positioned at least partially within the inner bore of the outer shell, wherein the inner conductor portion is configured to be electrically coupled to an inner conductor of the coaxial transmission medium and electrically isolated from the conductive layer of the outer conductor portion.

12. The coaxial connector of claim 11, wherein the outer surface defines an inwardly extending taper.

13. The coaxial connector of claim 11, wherein the outer shell defines an outwardly-extending flange at the first open end.

14. The coaxial connector of claim 13, wherein the outwardly-extending flange defines a rounded surface.

15. The coaxial connector of claim 13, wherein the outwardly-extending flange defines an inwardly-facing surface oriented in the axial direction.

16. The coaxial connector of claim 11, wherein the outer surface defines one or more inwardly-extending grooves.

17. A method for forming coaxial connector, the method comprising:

molding a polymer to form an outer conductor portion having an outer shell that defines an outer surface and an inner bore extending from a first open end to a second open end opposite the first open end, wherein the first open end comprises at least two deformable portions that are elastically deformable in a radial direction transverse to the axial direction;

applying a conductive layer to the inner bore and the outer surface, wherein the conductive layer continuously wraps around an end of the at least two deformable portions of the polymer shell from the inner bore to the outer surface; and inserting an inner conductor portion at least partially into the inner bore of the outer shell, wherein the inner conductor portion is structurally configured to be electrically coupled to an inner conductor of a coaxial transmission medium.

18. The method of claim 17, wherein applying the conductive layer comprises at least one of chemical deposition and physical deposition.

19. The coaxial connector of claim 1, wherein:

the outer conductive portion comprises a first portion including the first open end and a second portion including the second open end; and the outer surface defines a plurality of inwardly-extending grooves circumscribing the outer conductive portion.

* * * * *